United States Patent Office 3,739,004
Patented June 12, 1973

3,739,004
SYNTHESIS FERROCENYL BUTADIENE
COMPOUNDS
Billy W. Ponder, Tuscaloosa, and Charles W. Barnhill, Birmingham, Ala., assignors to the United States of America as represented by the Secretary of the Army
No Drawing. Filed Oct. 1, 1971, Ser. No. 185,856
Int. Cl. C07f 15/02
U.S. Cl. 260—439 CY            6 Claims

ABSTRACT OF THE DISCLOSURE

The process for making ferrocenyl butadiene by reacting ferrocenealdehyde in tetrahydrofuran solvent with allyllithium to produce ferrocenylbutenol, and then reacting the ferrocenylbutenol in a dehydration reaction in the presence of neutral alumina to produce butadienylferrocene. The butadienylferrocene can be used in the preparation of polymers for solid propellant binders such as being copolymerized with butadiene.

BACKGROUND OF THE INVENTION

The ferrocenes are usually used in the liquid form as ballistic modifiers in solid propellant compositions and also serve as plasticizing agents. In the liquid stages, the additives exhibit inherent disadvantages that are characteristic of liquid additives such as loss by evaporation, migration, etc., and consequently, the propellant systems suffer when stored for long periods of time. Therefore, modified forms of ferrocene additives are needed which are not subject to loss by evaporation or migration when stored in solid propellant compositions.

Therefore, it is an object of this invention to provide a novel process by which ferrocenylbutenol can be prepared and further processed into butadienylferrocene.

Another object of this invention is to provide a process by which butadienylferrocene can be prepared and then copolymerized with other butadienes to form useful solid propellant binders.

SUMMARY OF THE INVENTION

In accordance with this invention, a process for making butadienylferrocene is provided which includes reacting ferrocenealdehyde in an organic solvent tetrahydrofuan with allyllithium to form ferrocenylbutenol. The ferrocenylbutenol is next dehydrated in the presence of neutral alumina to form the desired butadienylferrocene. This compound can then be copolymerized or mixed with other ingredients and used as desired.

DETAILED DESCRIPTION OF THE INVENTION

The process for producing butadienylferrocene according to this invention is as follows: ferrocenealdehyde in an organic solvent such as tetrahydrofuran is reacted with allyllithium in a molar ratio of about 1 to 1 to about 1 to 2 of said ferrocenealdehyde to said allyllithium. After the reaction is complete, the lithium complex is hydrolyzed and the solution is later washed and dried to form the product 1-ferrocenyl-3-butenol. The 1-ferrocenyl-3-butenol is then reacted with neutral alumina in a vacuum sublimer to produce the dehydrated product 1,3-butadienylferrocene.

A specific example of preparing 1,3-butadienylferrocene is set forth in the example below.

EXAMPLE

To a three-necked, one-liter flask equipped with a sealed paddle-stirrer, a Friedricks condenser, a pressure-equalizing addition funnel and a nitrogen inlet tube, 25 g. (0.117 mole) of ferrocenealdehyde in 300 ml. tetrahydrofuran solvent was added. Allyllithium (0.117 mole) was delivered dropwise from the addition funnel during a period of one hour. The reaction was run under a dry nitrogen atmosphere. After completion of addition the mixture was allowed to stir overnight. The following day the lithium complex was hydrolyzed by pouring it into a crushed-ice slurry containing one equivalent of HCl. The product was then extracted with methylene chloride and washed three consecutive times with 100 ml. portions of sodium hydroxide solution in order to remove the phenol by-product. The phenol resulted from the hydrolysis of lithium phenoxide which was formed as a by-product during preparation of the allyllithium. The solution was subsequently washed with a solution of saturated sodium chloride. After drying the solution over anhydrous sodium sulfate, the solution was evaporated on a rotary evaporator.

Gas-liquid chromatographic analysis revealed the 1-ferrocenyl-3-butenol to be formed in 71% yield. The use of a two-fold excess of allyllithium, combined with a 20 hour stirring time at 0° C., results in the formation of 1-ferrocenyl-3-buten-1-ol in 96% yield.

Infrared analysis revealed strong hydroxyl absorption at 3400 cm.$^{-1}$. This crude mixture was separated by elution chromatography on a colum of neutral alumina. Two bands were eluted. The first band, which was eluted with a 50/50 hexane-benzene mixture, was found to be the dehydrated product, 1,3-butadienyl-ferrocene. The second band, which was eluted with benzene-ether, was a mixture of ferrocenealdehyde and 1-ferrocenyl-3-buten-1-ol. The reaction proceeds as illustrated below:

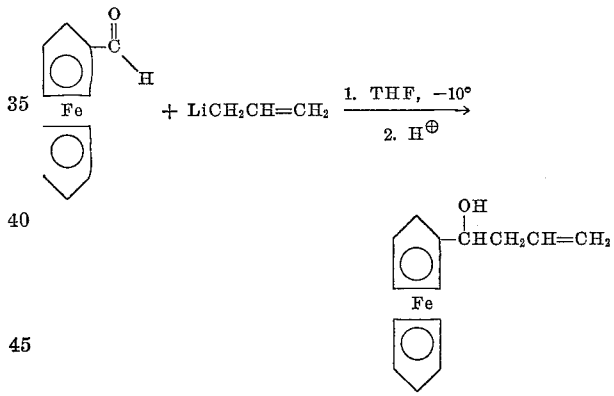

Dehydration of 1-ferrocenyl-3-buten-1-ol

Five grams of 96% pure 1-ferrocenyl-3-buten-1-ol contaminated only by 4% ferrocenealdehyde was mixed intimately with 15 grams of neutral alumina and placed in a vacuum sublimer. The system was maintained at 155° C. and 5 mm. pressure until sufficient collection of the dehydrated product was noted on the cold finger condenser. After scraping the butadienylferrocene from the cold finger, the mixture was stirred thoroughly, and again heated. Four grams of 1,3-butadienylferrocene, in the form of red flakes (M.P. 79–82) was collected from the combined scrapings. Gas-liquid chromatographic analysis revealed the presence of 99.% 1,3-butadienylferrocene and 1% ferrocenealdehyde.

An infrared spectrum revealed strong carbon-carbon double bond absorption at 1600 and 1640 cm.$^{-1}$. The absence of hydroxyl and carbonyl absorption suggests insignificant contamination of the product by the starting products, 1-ferrocenyl-3-buten-1-ol and ferrocenealdehyde. An absorption at 1420 cm.$^{-1}$, along with the 1640 cm.$^{-1}$ absorption is indicative of the terminal vinyl group. The existence of conjugation is revealed by the 1640 and 1600 cm.$^{-1}$ carbon-carbon double bond absorptions.

*Analysis.*—Calcd. for $C_{14}H_{14}Fe$ (percent): C, 70.59; H, 5.88; Fe, 21.49. Found (percent): C, 70.30; H, 5.93; Fe, 21.91.

The dehydration reaction takes place as illustrated below:

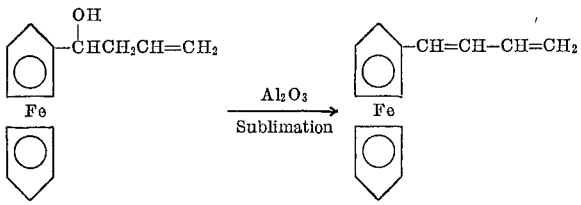

An NMR spectrum of 1,3-butadienylferrocene was obtained in carbon tetrachloride as solvent with tetramethyl silane as an internal standard. It revealed a strong singlet (4.06$\delta$, 5H) due to the five equivalent hydrogens on the unsubstituted ferrocene ring; two singlets (4.2$\delta$, 2H) and (4.32$\delta$, 2H) due to the two sets of non-equivalent hydrogens on the substituted ferrocene ring; a poorly resolved quartet centered at 5.04$\delta$ (2H) (actually this is a pair of closely spaced doublets due to the two non-equivalent terminal vinyl hydrogens) and an extremely broad singlet centered at 6.31$\delta$ (3H) (with poorly resolved fine structure) due to the three slightly non-equivalent internal vinyl hydrogens of the butadienyl group.

The butadienylferrocene according to this invention is very useful as a monomer in the preparation of homopolymers for propellant applications or it may be copolymerized with butadienes to give butadienylferrocene-butadiene copolymers which are useful in solid propellant binders.

We claim:
1. The process comprising reacting ferrocenealdehyde with allyllithium under a dry nitrogen atmosphere to produce 1-ferrocenyl-3-buten-1-ol.
2. The process as set forth in claim 1, wherein said ferrocenealdehyde is in the organic solvent tetrahydrofuran and said allyllithium is added dropwise to said ferrocenealdehyde and then stirred.
3. The process as set forth in claim 2, wherein said reaction product is washed in saturated sodium chloride and dried over anhydrous sodium sulfate and finally evaporated to separate said 1-ferrocenyl-3-buten-1-ol.
4. The process as set forth in claim 3, wherein said ferrocenealdehyde and said allyllithium are reacted in molar ratios of about 1 to 1 to about 1 to 2.
5. The process as set forth in claim 4, wherein said 1-ferrocenyl-3-buten-1-ol is dehydrated by reacting with neutral alumina to produce 1,3-butadienylferrocene.
6. The process of claim 5, wherein said dehydration reaction is carried out in a vacuum sublimer at a temperature of about 155° C. and 5 mm. pressure.

References Cited

Schlögl et al.: Naturwissenschaften 9, 1961, pp. 376–7.
Osgerby et al.: J. Chem. Soc. 1961, pp. 4604–8.

DANIEL E. WYMAN, Primary Examiner
A. P. DEMERS, Assistant Examiner

U.S. Cl. X.R.
149—19